United States Patent
Mori

(10) Patent No.: US 6,726,986 B2
(45) Date of Patent: Apr. 27, 2004

(54) MAGNETIC RECORDING MEDIUM

(75) Inventor: Masahiko Mori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 53 days.

(21) Appl. No.: 10/235,790

(22) Filed: Sep. 6, 2002

(65) Prior Publication Data

US 2003/0113587 A1 Jun. 19, 2003

(30) Foreign Application Priority Data

Sep. 10, 2001 (JP) .................................... P.2001-273884

(51) Int. Cl.$^7$ ............................................... G11B 5/706
(52) U.S. Cl. .................. 428/329; 428/694 BH
(58) Field of Search ........................... 428/329, 694 BH

(56) References Cited

U.S. PATENT DOCUMENTS 6,254,964 B1 * 7/2001 Saito et al. .................. 428/141
6,291,052 B1 * 9/2001 Takahashi et al. .......... 428/141

* cited by examiner

*Primary Examiner*—Stevan A. Resan
(74) *Attorney, Agent, or Firm*—Sughrue Mion, PLLC

(57) ABSTRACT

A magnetic recording medium comprising a support having thereon a magnetic layer containing a ferromagnetic powder and a binder as main components, wherein the ferromagnetic powder is a hexagonal ferrite powder having an average tabular diameter of from 10 to 40 nm, and a part which is subjected to magnetic flux revolution by the application of a magnetic field of 400 kA/m (5,000 Oe) or higher in the distribution of magnetization of the magnetic layer is less than 1%.

3 Claims, No Drawings

MAGNETIC RECORDING MEDIUM

FIELD OF THE INVENTION

The present invention relates to a coating type magnetic recording medium (i.e., a magnetic recording particulate medium) capable of high density recording, in particular, to a magnetic recording medium wherein magnetic particle distribution is reduced and electromagnetic characteristics in high density recording is improved.

BACKGROUND OF THE INVENTION

In the field of magnetic disc, a 2 MB MF-2HD floppy disc using Co-modified iron oxide has been generally loaded in a personal computer. However, along with the increase in the amount of data to be dealt with, the capacity thereof has become insufficient and the increase of the capacity of the floppy disc has been demanded.

In the field of magnetic tape also, with the prevalence of the office computer, such as minicomputers, personal computers and work stations, magnetic tapes for recording computer data as external storage media (a so-called backup tape) have been eagerly studied. For putting magnetic tapes for such usage to practical use, the improvement of recording capacity has been strongly demanded conjointly with the miniaturization of a computer and the increase of information processing performance (i.e., the increase of throughput) for achieving high capacity recording and the miniaturization.

Magnetic layers comprising an iron oxide, a Co-modified iron oxide, $CrO_2$, a ferromagnetic metal powder, or a hexagonal ferrite powder dispersed in a binder, which are coated on a nonmagnetic support, have been conventionally widely used in magnetic recording media. Of these, hexagonal ferrite fine powders have been known to be excellent in high density recording characteristics, however, when inductive heads which have been mainly used in the system using flexible media are used, hexagonal ferrite fine powders are small in saturation magnetization, hence sufficient output cannot be obtained. However, a magneto-resistance head (an MR head) which is used in a hard disc has also come to be used in removable recording using flexible media as above.

Since the MR heads are high sensitivity, sufficient reproduction output can be obtained even when hexagonal ferrite fine powders are used, and it is known that a high C/N ratio can be obtained due to the reduction of noise which is the characteristic of hexagonal ferrite fine powders. For instance, an example of the reproduction with an MR head by using a barium ferrite (BaFe) fine powder is disclosed in JP-A-10-302243 (the term "JP-A" as used herein means an "unexamined published Japanese patent application").

Coercive force (Hc) measured in BaFe magnetic powders of generally from about 40 to about 400 kA/m (from 500 to 5,000 Oe) can be produced. Higher Hc is advantageous for high density recording but it is restricted by the capacities of recording heads. When saturation magnetization of a recording head exceeds 1.4 T (tesla), the coercive force is preferably 175 kA/m (2,200 Oe) or higher, but recording by the magnetic flux revolution is difficult when the coercive force is 400 kA/m (5,000 Oe) or higher. A high Hc part of 400 kA/m (5,000 Oe) or higher substantially does not contribute to recording and reproduction in the distribution of magnetization of a magnetic layer due to magnetic particle distribution, and the reduction of reproduction output and recording and the increase of noise are caused when high Hc parts increase.

SUMMARY OF THE INVENTION

An object of the present invention is to provide a coating type magnetic recording medium (i.e., a magnetic recording particulate medium) which is excellent in electromagnetic characteristics, conspicuously improved in C/N ratio in high density recording region, excellent in productivity, and inexpensive, further, low in noise and excellent in high density characteristics in a recording and reproducing system integrated with an MR head.

The object of the present invention has been achieved by a magnetic recording medium comprising a support having thereon a magnetic layer containing a ferromagnetic powder and a binder as main components, wherein the ferromagnetic powder is a hexagonal ferrite powder having an average tabular diameter of from 10 to 40 nm, and the part which is subjected to magnetic flux revolution by the application of a magnetic field of 400 kA/m (5,000 Oe) or higher in the distribution of magnetization of the magnetic layer is less than 1%.

A preferred mode of the present invention is as follows.

(1) The magnetic recording medium is a magnetic recording medium for reproduction with a magneto-resistance type magnetic head (an MR head).

DETAILED DESCRIPTION OF THE INVENTION

Hexagonal ferrite powders used in a magnetic layer in the present invention are tabular particles and the tabular diameter of hexagonal ferrite powders should be restricted to 10 to 40 nm. Further, by restricting at least a part which is subjected to magnetic flux revolution by the application of a magnetic field of 400 kA/m (5,000 Oe) or higher (also called a high Hc part) in the distribution of magnetization of the magnetic layer, the influence of a high Hc part can be lessened, to thereby improve the reduction of reproduction output in high density recording and the increase of noises, as a result, a magnetic recording medium having a high C/N ratio and excellent overwriting aptitude can be provided.

A part subjected to magnetic flux revolution by the application of a magnetic field of 400 kA/m (5,000 Oe) or higher in the distribution of magnetization of the magnetic layer in the present invention means a part subjected to magnetic flux revolution by the applied magnetic field of 400 kA/m (5,000 Oe) or higher on the differential curve of Remanence curve. In the magnetic recording medium according to the present invention, magnetic characteristics are controlled so that the part is less than 1%, preferably 0.7% or less, and more preferably 0.5% or less. Remanence curve is drawn by applying a magnetic field of −800 kA/m (−10 kOe) in the direction horizontal to a magnetic plane of a magnetic layer, saturating the magnetic layer, making the magnetic field zero, applying a magnetic field of equal interval (e.g., 8 kA/m (100 Oe)) in the reverse direction, making the magnetic field zero, measuring residual magnetic flux densities (Br) and differences thereof, and taking the differences of Br as y-axis and the applied magnetic fields as x-axis. "Less than 1%" means the ratio of the same area of a differential curve corresponding to 400 kA/m (5,000 Oe) or larger of the whole area enclosed with the differential curve at large taking applied magnetic field as X-axis and dy/dx as Y-axis and X-axis.

A means for obtaining the above differential curve, i.e., a means for reducing high Hc parts, is not particularly restricted in the present invention. The means is to use hexagonal ferrite powder shaving less high Hc parts, specifically removing hexagonal ferrite powders having a tabular diameter of less than 10 nm by centrifugation and the like, and selecting and unifying the crystal structures and compositions of hexagonal ferrite powders.

Even when the average tabular diameter of hexagonal ferrite magnetic powders is in the range of from 10 to 40 nm, a C/N ratio and an overwriting erasure rate are not improved if a high Hc part is 1% or more. On the other hand, even when a part subjected to magnetic flux revolution is less than 1%, a C/N ratio is not improved if the average tabular diameter of hexagonal ferrite magnetic powders is higher than 40 nm.

Further, when a high Hc part is less than 1% and the average tabular diameter of hexagonal ferrite magnetic powders is less than 10 nm, it is difficult to obtain stable magnetic recording due to thermal fluctuation.

In addition, the coercive force of the magnetic layer in the present invention is preferably as large as possible within the range of satisfying the condition of a high Hc part, and it is generally 159 kA/m (2,000 Oe) or more, preferably from 159 to 400 kA/m (2,000 to 5,000 Oe), but the upper limit depends upon the system to which the magnetic recording medium is applied, in particular, it depends upon the saturation magnetization of the magnetic head for recording.

Areal recording density is represented by the product of linear recording density and track density, and the recording density in the present invention can be made large by twice or more as compared with the recording density of DDS-4 and the like commercially available at present. When the areal recording density is smaller than 1 Gbit/inch$^2$ (0.155 Gbit/cm$^2$), high recording density can be achieved even with a magnetic recording medium of out of the scope of the present invention, and when it is greater than 8 Gbit/inch$^2$ (1.24 Gbit/cm$^2$), high recording density cannot be attained even with a magnetic recording medium within the scope of the present invention.

A recording head for recording a signal on the magnetic recording medium according to the present invention should not be particularly restricted but an electromagnetic induction type thin film magnetic head, e.g., an MIG head, is preferably used.

The magnetic recording medium according to the present invention is described with every constituent element below.

Magnetic Layer

The magnetic recording medium according to the present invention may have a magnetic layer on either one side of a support or on both sides. When a magnetic layer is provided on a lower layer, the magnetic layer (also called an upper layer or an upper magnetic layer) may be coated after the lower layer is coated and while the lower layer is still wet (W/W coating) or the magnetic layer may be coated after the lower layer coated is dried (W/D coating). Simultaneous or successive coating is preferred in view of the productivity but wet-on-dry coating can be sufficiently used in the case of a disc. In the multilayer constitution according to the present invention, since an upper layer and a lower layer can be formed by simultaneous or successive coating (W/W coating), a surface treatment step, e.g., a calendering step, can be utilized effectively and surface roughness of the upper magnetic layer can be improved even the layer is an ultra-thin layer. Since a magnetic layer is thin when an MR head is used, multilayer constitution using a lower layer is preferred.

The thickness of a magnetic layer is generally from 0.03 to 3 μm, preferably from 0.05 to 1.5 μm, and more preferably from 0.05 to 0.5 μm. When a magnetic layer is thinner than 0.03 μm, reproduction output is insufficient, while when it is thicker than 3 μm, resolution is reduced.

Hexagonal Ferrite Powder

The examples of hexagonal ferrite powders include substitution products of each barium ferrite, strontium ferrite, lead ferrite and calcium ferrite and Co substitution products. Specifically, magnetoplumbite type barium ferrite and strontium ferrite, magnetoplumbite type ferrite having covered the particle surfaces with spinel, magnetoplumbite type barium ferrite and strontium ferrite, etc., partially containing spinel phase are exemplified. Hexagonal ferrite powders may contain, in addition to prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, hexagonal ferrite powders containing the following elements, e.g., Co—Zn, Co—Ti, Co—Ti—Zr, Co—Ti—Zn, Ni—Ti—Zn, Nb—Zn—Co, Sb—Zn—Co and Nb—Zn can be used. According to starting materials and producing processes, specific impurities may be contained.

The average tabular diameter of hexagonal ferrite magnetic powders means the average of hexagonal tabular diameters, and it is generally from 10 to 40 nm, preferably from 10 to 35 nm, and particularly preferably from 15 to 35 nm. When reproduction is performed using an MR head particularly for increasing track density, it is necessary to reduce noise, and the tabular diameter is preferably 35 nm or less in such a case, but when the tabular diameter is smaller than 10 nm, stable magnetization cannot be obtained due to thermal fluctuation. While when the tabular diameter is larger than 40 nm, noise increases, thus none of such tabular diameters are suitable for high density recording according to the present invention. The average tabular ratio (the arithmetic mean of tabular diameter/tabular thickness) of hexagonal ferrite magnetic powders is preferably from 1 to 15, more preferably from 1 to 7. When the average tabular ratio is small, the packing density in a magnetic layer becomes high, which is preferred, but sufficient orientation cannot be obtained. When the average tabular ratio is higher than 15, noise increases due to stacking among particles. The specific surface area ($S_{BET}$) measured by the BET method of the particle sizes having diameters within this range is generally from 10 to 100 m$^2$/g. The specific surface area nearly coincides with the value obtained by arithmetic operation from tabular diameter and tabular thickness of a particle. The distribution of tabular diameter and tabular thickness of particles is in general preferably as narrow as possible, but it is not particularly restricted so long as it satisfies the distribution of magnetization according to the present invention. Specific surface area distributions in numerical values can be compared by measuring TEM photographs of 500 particles selected randomly. The distributions are not regular distributions in many cases, but a variation coefficient (σ/average diameter) expressed by the standard deviation to the average diameter (average tabular diameter or average thickness) by computation is generally from 0.1 to 2.0, preferably from 0.1 to 1.0, and more preferably from 0.1 to 0.5. For obtaining narrow particle size distribution, it is efficient to make a particle-forming reaction system homogeneous to the utmost, to subject particles formed to distribution-improving treatments as well. For example, a method of selectively dissolving ultrafine particles in an acid solution, and a method of using centrifugation as described above are exemplified as the methods of obtaining narrow particle size distribution. The average volume of hexagonal ferrite fine powders is from 1,000 to 10,000 nm$^3$, preferably from 1,500 to 8,000 nm$^3$, and more preferably from 2,000 to 8,000 nm$^3$.

Coercive force (Hc) measured in magnetic powders of generally from about 40 to about 400 kA/m can be produced. Higher Hc is advantageous for high density recording but it is restricted by the capacity of a recording head. Magnetic powders preferably have Hc of from about 119 to about 397 kA/m, and more preferably from 159 to 320 kA/m. When the saturation magnetization of ahead is higher than 1.4 tesla, Hc is preferably 175 kA/m or more. Hc can be controlled by particle diameters (tabular diameter/tabular thickness), the kinds and amounts of elements contained, the substitution sites of elements, and the reaction conditions of particle formation. Saturation magnetization (as) is from 40 to 80 $A \cdot m^2/kg$. Saturation magnetization has inclination of becoming smaller as particles become finer. For improving saturation magnetization, it is well known to use composite of magnetoplumbite ferrite with spinel ferrite, to select the kinds and amounts of elements to be contained, or W-type hexagonal ferrite can also be used. When magnetic powders are dispersed, the particle surfaces of the magnetic powders may be treated with substances compatible with the dispersion media and the polymers. Inorganic or organic compounds are used as the surface treating agents. Oxides or hydroxides of Si, Al, P, etc., various kinds of silane coupling agents, and various kinds of titanium coupling agents are representative examples. The amount of these surface treating agents is from 0.1 to 10% based on the amount of the magnetic powder. The pH of magnetic powders is also important for dispersion. pH is generally from 4 to 12 or so, and the optimal value is dependent upon the dispersion medium and the polymer. Taking the chemical stability and the storage stability of magnetic media into consideration, pH of from about 6 to about 11 is selected. The water content in the magnetic powder also affects dispersion. The optimal value is dependent upon the dispersion medium and the polymer, and the water content of from 0.01 to 2.0% based on the magnetic powder is selected in general. Producing methods of hexagonal ferrite powders include the following methods and any of these methods can be used in the present invention, i.e., a glass crystallization method comprising the steps of mixing metallic oxides which substitute barium oxide, iron oxide and iron with boron oxide as a glass-forming material so as to make a desired ferrite composition, melting and then quenching the mixture to obtain an amorphous product, subjecting the amorphous product obtained to reheating, washing and then pulverizing to obtain a barium ferrite crystal powder; a hydrothermal reaction method comprising the steps of neutralizing a solution of a metallic salt having barium ferrite composition with an alkali, removing the byproducts produced, heating the liquid phase at 100° C. or more, washing, drying and then pulverizing to thereby obtain a barium ferrite crystal powder; and a coprecipitation method comprising the steps of neutralizing a solution of a metallic salt having barium ferrite composition with an alkali, removing the byproducts produced and drying, treating the system at 1,100° C. or less, and then pulverizing to obtain a barium ferrite crystal powder.

Lower Layer

The lower layer is described in detail below. The constitution of the lower layer in the present invention is not particularly limited so long as it is substantially nonmagnetic but, in general, the lower layer comprises at least a resin, preferably a powder, e.g., an inorganic or organic powder dispersed in a resin. The inorganic powder is, in general, preferably a nonmagnetic powder but a magnetic powder can also be contained so long as the lower layer is substantially nonmagnetic. "The lower layer is substantially nonmagnetic" means that the lower layer may be magnetic within the range of not substantially reducing the electromagnetic characteristics of the upper layer.

Nonmagnetic powders can be selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred because they have small particle size distribution and various means for imparting functions, and titanium dioxide and alpha-iron oxide are more preferred. These nonmagnetic powders preferably have an average particle size of from 0.005 to 2 μm. A plurality of nonmagnetic powders each having a different particle size may be combined, if necessary, or a single nonmagnetic powder having a broad particle size distribution may be employed so as to attain the same effect as such a combination. A particularly preferred particle size of nonmagnetic powders is from 0.01 to 0.2 μm. In particular, when nonmagnetic powders are granular metallic oxides, their average particle size is preferably 0.08 μm or less, and when nonmagnetic powders are acicular metallic oxides, their long axis length is preferably 0.3 μm or less, and more preferably 0.2 μm or less. Nonmagnetic powders for use in the present invention have a tap density of from 0.05 to 2 g/ml, and preferably from 0.2 to 1.5 g/ml; a water content of generally from 0.1 to 5 mass % (i.e., weight %), preferably from 0.2 to 3 mass %, and more preferably from 0.3 to 1.5 mass %; and a pH value of generally from 2 to 11, and particularly preferably from 3 to 10.

Nonmagnetic powders for use in the present invention have a specific surface area ($S_{BET}$) of from 1 to 100 m$^2$/g, preferably from 5 to 80 m$^2$/g, and more preferably from 10 to 70 m$^2$/g; a crystallite size of from 0.004 to 1 μm, and more preferably from 0.04 to 0.1 μm; an oil absorption amount using DBP (dibutyl phthalate) of from 5 to 100 ml/100 g, preferably from 10 to 80 ml/100 g, and more preferably from 20 to 60 ml/100 g; and a specific gravity of from 1 to 12, and preferably from 3 to 6. The figure of nonmagnetic powders may be any of acicular, spherical, polyhedral and tabular shapes. Nonmagnetic powders preferably have a Mohs' hardness of from 4 to 10. The SA (stearic acid) adsorption amount of nonmagnetic powders is from 1 to 20 μmol/m$^2$, preferably from 2 to 15 μmol/m$^2$, and more preferably from 3 to 8 μmol/m$^2$. The pH value of nonmagnetic powders is preferably between 3 and 6. The surfaces of these nonmagnetic powders are preferably covered with $Al_2O_3$, $SiO_2$, $TiO_2$, $ZrO_2$, $SnO_2$, $Sb_2O_3$, ZnO or $Y_2O_3$. $Al_2O_3$, $SiO_2$, $TiO_2$ and $ZrO_2$ are preferred in the point of dispersibility, and $Al_2O_3$, $SiO_2$ and $ZrO_2$ are more preferred. These surface-covering agents can be used in combination or may be used alone. Surface treatment may be performed by coprecipitation, alternatively, surface treatment of particles may be previously performed to be covered with alumina in the first place, then the alumina-covered surface may be covered with silica, or vice versa, according to purposes. A surface-covered layer may be porous, if necessary, but a homogeneous and dense surface is generally preferred.

The specific examples of nonmagnetic powders for use in the lower layer according to the present invention include Nanotite (manufactured by Showa Denko Co., Ltd.), HIT-100 and ZA-G1 (manufactured by Sumitomo Chemical Co., Ltd.), alpha-hematite DPN-250, DPN-250BX, DPN-245, DPN-270BX, DPN-500BX, DBN-SA1 and DBN-SA3 (manufactured by Toda Kogyo Co., Ltd.), titanium oxide TTO-51B, TTO-55A, TTO-55B, TTO-55C, TTO-55S, TTO-55D, SN-100, alpha-hematite E270, E271, E300 and E303 (manufactured by Ishihara Sangyo Kaisha K.K.), titanium oxide STT-4D, STT-30D, STT-30, STT-65C, and alpha-hematite alpha-40 (manufactured by Titan Kogyo Co., Ltd.), MT-100S, MT-100T, MT-150W, MT-500B, MT-600B, MT-100F and MT-500HD (manufactured by Teika Co., Ltd.), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), and 100A, 500A, and calcined products of them (manufactured by Ube Industries, Ltd.). Particularly preferred nonmagnetic powders are titanium dioxide and alpha-iron oxide.

By the incorporation of carbon blacks into the lower layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into the lower layer. Furnace blacks for rubbers, thermal blacks for rubbers, carbon blacks for coloring and acetylene blacks can be used as carbon blacks. Carbon blacks used in the lower layer should optimize the following characteristics by the desired effects and sometimes more effects can be obtained by the combined use.

Carbon blacks for use in the lower layer according to the present invention have a specific surface area ($S_{BET}$) of from 100 to 500 $m^2/g$, and preferably from 150 to 400 $m^2/g$, a DBP oil absorption of from 20 to 400 ml/100 g, and preferably from 30 to 400 ml/100 g, a particle size of from 5 to 80 nm, preferably from 10 to 50 nm, and more preferably from 10 to 40 nm, pH of from 2 to 10, a water content of from 0.1 to 10%, and a tap density of from 0.1 to 1 g/ml. The specific examples of carbon blacks for use in the lower layer according to the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Chemical Corp.), CONDUC-TEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface may be graphitized before use. Carbon blacks may be dispersed in a binder in advance before being added to a coating solution. Carbon blacks can be used within the range not exceeding 50 mass % (i.e., weight %) based on the above inorganic powders and not exceeding 40 mass % based on the total weight of the nonmagnetic layer. These carbon blacks can be used alone or in combination. Regarding carbon blacks for use in the present invention, the description, e.g., in *Carbon Black Binran* (*Handbook of Carbon Blacks*) (edited by Carbon Black Association) can be referred to.

Organic powders can be used in the lower layer according to the purpose. The examples of such organic powders include an acryl styrene resin powder, a benzoguanamine resin powder, a melamine resin powder, and a phthalocyanine pigment. Besides the above, a polyolefin resin powder, a polyester resin powder, a polyamide resin powder, a polyimide resin powder, and a polyethylene fluoride resin powder can also be used. The producing methods of these resin powders are disclosed in JP-A-62-18564 and JP-A-60-255827.

Binder

Binders, lubricants, dispersants, additives, solvents, dispersing methods and others for use in the magnetic layer described below can be used in the lower layer and the back coating layer described later. In particular, with respect to the amounts and the kinds of binders, additives, the amounts and the kinds of dispersants, well-known prior art techniques regarding the magnetic layer can be applied to the lower layer.

Conventionally well-known thermoplastic resins, thermosetting resins, reactive resins and mixtures of these resins are used as a binder in the present invention. Thermoplastic resins having a glass transition temperature of from −100 to 150° C., a number average molecular weight of from 1,000 to 200,000, preferably from 10,000 to 100,000, and a polymerization degree of about 50 to about 1,000 can be used in the present invention.

The examples of such compounds include polymers or copolymers containing as a constituting unit the following compounds, e.g., vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins. The examples of thermosetting resins and reactive resins which can be used in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyol and polyisocyanate, and mixtures of polyurethane and polyisocyanate. These resins are described in detail in *Plastic Handbook*, published by Asakura Shoten. It is also possible to use well-known electron beam-curable type resins in each layer. The examples of these resins and producing methods are disclosed in detail in JP-A-62-256219. These resins can be used alone or in combination. The examples of preferred combinations include at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, and polycaprolactone polyurethane. Concerning every binder shown above, it is preferred that at least one polar group selected from the following groups is introduced by copolymerization or addition reaction for the purpose of further improving dispersibility and durability, e.g., —COOM, —$SO_3M$, —$OSO_3M$, —P=O$(OM)_2$, —O—P=O$(OM)_2$ (wherein M represents a hydrogen atom, or an alkali metal salt group), —OH, —$NR_2$, —$N^+R_3$ (R represents a hydrocarbon group) an epoxy group, —SH and —CN. The content of these polar groups is from $10^{-1}$ to $10^{-8}$ mol/g, and preferably from $10^{-2}$ to $10^{-6}$ mol/g.

The specific examples of binders for use in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.), Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Ink & Chemicals, Inc.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichi Seika K.K.), MX5004 (manufactured by Mitsubishi Chemical Corp.), Sunprene SP-150 (manufactured by Sanyo Chemical Industries Co. Ltd.), and Salan F310 and F210 (manufactured by Asahi Chemical Industry Co., Ltd.).

The amount of the binder for use in the lower layer and the magnetic layer according to the present invention is from 5 to 50 mass %, and preferably from 10 to 30 mass %, based on the amount of the nonmagnetic powder or the magnetic powder. When vinyl chloride resins are used as the binder, the amount is from 5 to 30 mass %, when polyurethane resins are used, the amount is from 2 to 20 mass %, and also it is preferred that polyisocyanate is used in an amount of from 2 to 20 mass % in combination with them. However, for instance, when head corrosion is caused by a slight amount of chlorine due to dechlorination, it is possible to use polyurethane alone or a combination of polyurethane and isocyanate. When polyurethane is used in the present invention, it is preferred that the polyurethane has a glass transition temperature of from −50 to 150° C., preferably from 0 to 100° C., breaking extension of from 100 to 2,000%, breaking stress of from 0.05 to 10 kg/mm$^2$ (0.49 to 98 MPa), and a yielding point of from 0.05 to 10 kg/mm$^2$ (0.49 to 98 MPa).

The magnetic recording medium in the present invention may comprise two or more layers. Accordingly, the amount of the binder, the amounts of the vinyl chloride resins, the polyurethane resins, the polyisocyanate or other resins contained in the binder, the molecular weight of each resin constituting the magnetic layer, the amount of the polar groups, or the above-described physical properties of resins can of course be varied in the lower layer and the magnetic layer, according to necessity. These factors should be rather optimized in each layer. Well-known techniques with respect to multilayer magnetic layers can be used in the present invention. For example, when the amount of the binder is varied in each layer, it is effective to increase the amount of the binder contained in the magnetic layer to reduce scratches on the surface of the magnetic layer. For improving the head touch against a head, it is effective to increase the amount of the binder in the lower layer to impart flexibility.

The examples of polyisocyanates for use in the present invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone, or in combinations of two or more taking the advantage of a difference in curing reactivity in each layer.

Carbon Black, Abrasive

The examples of carbon blacks for use in the magnetic layer according to the present invention include furnace blacks for rubbers, thermal blacks for rubbers, carbon blacks for coloring and acetylene blacks. Carbon blacks for use in the magnetic layer of the present invention have a specific surface area ($S_{BET}$) of from 5 to 500 m$^2$/g, a DBP oil absorption of from 10 to 400 ml/100 g, an average particle size of from 5 to 300 nm, preferably from 10 to 250 nm, and more preferably from 20 to 200 nm, pH of from 2 to 10, a water content of from 0.1 to 10%, and a tap density of from 0.1 to 1 g/ml. The specific examples of carbon blacks for use in the magnetic layer of the present invention include BLACKPEARLS 2000, 1300, 1000, 900, 905, 800 and 700 and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40 and #10B (manufactured by Mitsubishi Chemical Corp.), CONDUCTEX SC, RAVEN 150, 50, 40 and 15, RAVEN-MT-P (manufactured by Columbia Carbon Co., Ltd.), and Ketjen Black EC (manufactured by JAPAN EC Co., Ltd.). Carbon blacks for use in the present invention may previously be surface-treated with a dispersant, may be grafted with a resin, or a part of the surface may be graphitized before use. Carbon blacks may be dispersed in a binder in advance before being added to a magnetic coating solution. These carbon blacks may be used alone or in combination. Carbon blacks are preferably used in an amount of from 0.1 to 30% based on the amount of the magnetic powder. Carbon blacks can serve various functions such as preventing the static charge of a magnetic layer, reducing the friction coefficient, imparting a light-shielding property and improving film strength. Such functions vary depending upon the kind of carbon blacks to be used. Accordingly, it is of course possible in the present invention to select and determine the kinds, the amounts and the combinations of the carbon blacks to be added to the upper magnetic layer and the lower nonmagnetic layer, on the basis of the above mentioned various properties such as a particle size, an oil absorption amount, an electroconductivity and a pH value, or these should be rather optimized in each layer. Regarding carbon blacks for use in the magnetic layer in the present invention, compiled by Carbon Black Association, *Carbon Black Binran* (*Handbook of Carbon Blacks*) can be referred to, for example.

Zirconia beads and other abrasives can be used in combination in the present invention. As other abrasives, well-known materials essentially having a Mohs' hardness of 6 or more may be used alone or in combination, e.g., alpha-alumina having an alpha-conversion rate of 90% or more, beta-alumina, silicon carbide, chromium oxide, cerium oxide, alpha-iron oxide, corundum, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be attained so long as the content of the main component is 90 mass % or more. Abrasives preferably have an average particle size of from 0.01 to 2 μm and, in particular, for improving electromagnetic characteristics, abrasives having narrow particle size distribution are preferred. For improving durability, a plurality of abrasives each having a different particle size may be combined according to necessity, or a single abrasive having a broad particle size distribution may be used so as to attain the same effect as such a combination. Abrasives for use in the present invention preferably have a tap density of from 0.3 to 2 g/ml, a water content of from 0.1 to 5 mass %, a pH value of from 2 to 11 and a specific surface area ($S_{BET}$) of from 1 to 30 m$^2$/g. The figure of the abrasives for use in the present invention may be any of acicular, spherical and die-like figures. Abrasives having a figure partly with edges are preferably used, because a high abrasive property can be obtained. The specific examples of abrasives for use in the present invention include AKP-12, AKP-15, AKP-20, AKP-30, AKP-50, HIT-20, HIT-30, HIT-55, HIT-60, HIT-70, HIT-80 and HIT-100 (manufactured by Sumitomo Chemical Co., Ltd.), ERC-DBM, HP-DBM and HPS-DBM (manufactured by Reynolds International Inc.), WA10000 (manufactured by Fujimi Kenma K.K.), UB20 (manufactured by Uemura Kogyo K. K.), G-5, Chromex U2 and Chromex U1 (manufactured by Nippon Chemical Industrial Co., Ltd.), TF100 and TF140 (manufactured by Toda Kogyo Co., Ltd.), beta-Random and Ultrafine (manufactured by Ividen Co., Ltd.), and B-3 (manufactured by Showa Mining Co., Ltd.). These abrasives may be added to the lower layer, if necessary. By adding abrasives into the lower layer, it is possible to control the surface figure or prevent abrasives from protruding. The particle sizes and amounts of abrasives to be added to the magnetic layer and the lower layer should be selected independently at optimal values.

Additive

As additives which can be used in the magnetic layer and the lower layer of the present invention, those having a lubricating effect, an antistatic effect, a dispersing effect and a plasticizing effect may be used. The examples of additives which can be used in the present invention include molybdenum disulfide, tungsten disulfide, graphite, boron nitride, graphite fluoride, silicone oils, polar group-containing silicons, fatty acid-modified silicons, fluorine-containing silicons, fluorine-containing alcohols, fluorine-containing esters, polyolefins, polyglycols, alkyl phosphates and alkali metallic salts thereof, alkyl sulfates and alkali metallic salts thereof, polyphenyl ethers, phenylphosphonic acids, alpha-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkali metallic salts thereof, monobasic fatty acids having from 10 to 24 carbon atoms (which may contain an unsaturated bond or may be branched) and metallic salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

The specific examples of fatty acids as additives include capric acid, caprylic acid, lauric acid, myristic acid, palmitic acid, stearic acid, behenic acid, oleic acid, elaidic acid, linolic acid, linolenic acid and isostearic acid. The examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl, and the examples of alcohols as additives include oleyl alcohol, stearyl alcohol and lauryl alcohol. In addition to the above compounds, the examples of other additives which can be used include nonionic surfactants, e.g., alkylene oxide, glycerol, glycidol and alkylphenol-ethylene oxide adducts; cationic surfactants, e.g., cyclic amines, ester amides, quaternary ammonium salts, hydantoin derivatives, heterocyclic compounds, phosphonium and sulfonium; anionic surfactants containing an acidic group such as carboxylic acid, sulfonic acid, phosphoric acid, a sulfate group or a phosphate group; and amphoteric surfactants, e.g., amino acids, aminosulfonic acids, sulfates and phosphates of amino alcohols, and alkylbetains. The details of these surfactants are described in *Kaimen Kasseizai Binran* (*Handbook of Surfactants*), Sangyo Tosho Co., Ltd. These lubricants and antistatic agents need not be 100% pure and may contain impurities such as isomers, non-reacted products, byproducts, decomposed products and oxides, in addition to the main components. However, the content of such impurities is preferably 30 mass % or less, and more preferably 10 mass % or less.

The Lubricants and surfactants for use in the present invention have individually different physical functions. The kinds, amounts and proportions of combination generating synergistic effect of these lubricants should be determined optimally in accordance with the purpose. For example, the lower layer and the magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants are controlled so as to improve the coating stability, or the amount of the lubricant in the lower layer is made larger than that in the magnetic layer so as to improve the lubricating effect of the surface. The examples are by no means limited thereto. In general, the total amount of the lubricants is from 0.1 to 50 mass %, and preferably from 2 to 25 mass %, based on the ferromagnetic powder in the magnetic layer or the nonmagnetic powder in the lower layer.

All or a part of the additives to be used in the present invention may be added to a magnetic coating solution or a nonmagnetic coating solution in any step of the preparation. For example, additives may be blended with a magnetic powder before the kneading step, maybe added during the step of kneading a magnetic powder, a binder and a solvent, may be added during the dispersing step, may be added after the dispersing step, or may be added just before coating. According to the purpose, there is a case of capable of attaining the object by coating all or apart of the additives simultaneously with or successively after the coating of the magnetic layer. According to the purpose, lubricants may be coated on the surface of the magnetic layer after the calendering treatment (treatment by heating and pressuring with calender rolls) or after the completion of slitting.

Well-known organic solvents can be used in the present invention, e.g., organic solvents disclosed in JP-6-68453 can be used.

Layer Constitution

The thickness of a support in the magnetic recording medium according to the present invention is from 2 to 100 $\mu$m, and preferably from 2 to 80 $\mu$m. The thickness of a support for a computer tape is from 3.0 to 6.5 $\mu$m, preferably from 3.0 to 6.0 $\mu$m, and more preferably from 4.0 to 5.5 $\mu$m.

An under coating layer (or a subbing layer) may be provided between a support and a lower layer for adhesion improvement. The thickness of an under coating layer is from 0.01 to 0.5 $\mu$m, and preferably from 0.02 to 0.5 $\mu$m. The magnetic recording medium in the present invention may be a disc-like medium comprising a lower layer and a magnetic layer provided on both surface sides of a support or may be a disc-like medium or a tape-like medium comprising a lower layer and a magnetic layer provided on only one surface side. When a lower layer and a magnetic layer are provided on only one surface side of a support, a back coating layer may be provided on the surface side of the support opposite to the side having the lower layer and the magnetic layer for the purpose of static charge prevention and curling correction. The thickness of the back coating layer is from 0.1 to 4 $\mu$m, and preferably from 0.3 to 2.0 $\mu$m. Well-known under coating layers and back coating layers can be used for this purpose.

The thickness of the magnetic layer of the magnetic recording medium of the present invention can be optimally selected according to the saturation magnetization amount of the head used, the head gap length, and the recording signal zone, and the thickness is preferably from 0.05 to 0.5 $\mu$m, and more preferably from 0.1 to 0.25 $\mu$m. The magnetic layer may comprise two or more layers each having different magnetic characteristics and well-known multilayer magnetic layer structures can be applied to the present invention.

The thickness of the lower layer of the medium according to the present invention is generally from 0.2 to 5.0 $\mu$m, preferably from 0.3 to 3.0 $\mu$m, and more preferably from 1.0 to 2.5 $\mu$m. The lower layer exhibits the effect of the present invention so long as it is substantially nonmagnetic and may contain intentionally a small amount of a magnetic powder as an impurity. The term "substantially nonmagnetic" means that the residual magnetic flux density of the lower layer is 0.01 T or less or the coercive force of the lower layer is 7.96 kA/m (100 Oe or less), preferably the residual magnetic flux density and the coercive force are zero.

Back Coating Layer

In general, a magnetic tape for a computer data recording is decidedly required to have an excellent repeating-running property as compared with a video tape and an audio tape. For maintaining such high running durability, it is preferred for a back coating layer to contain a carbon black and an inorganic powder.

Two kinds of carbon blacks each having different average particle size are preferably used in combination. In this case, a combined use of a fine carbon black having an average particle size of from 10 to 20 nm and a coarse carbon black having an average particle size of from 230 to 300 nm is preferred. In general, by the incorporation of a fine carbon black as above, the surface electrical resistance of a back coating layer and also light transmittance can be set at low values. Since there are many kinds of magnetic recording apparatuses making use of light transmittance of a tape as a signal of operation, the addition of fine carbon blacks is particularly effective in such a case. In addition, a fine carbon black is in general excellent in retention of a liquid lubricant and contributes to the reduction of a friction coefficient when a lubricant is used in combination. On the other hand, a coarse carbon black having an average particle size of from 230 to 300 nm has a function as a solid lubricant and forms minute protrusions on the surface of a back coating layer, to thereby contribute to the reduction of a contact area and a friction coefficient. However, a coarse carbon black has a drawback such that, when it is used alone, particles are liable to drop out from the back coating layer due to the tape sliding during severe running, which leads to the increase of the error rate.

The specific examples of commercially available fine carbon blacks are shown below each with the average particle size in parentheses, e.g., RAVEN 2000B (18 nm) and RAVEN 1500B (17 nm) (manufactured by Columbia Carbon Co., Ltd.), BP800 (17 nm) (manufactured by Cabot Co., Ltd.), PRINTEX90 (14 nm), PRINTEX95 (15 nm), PRINTEX85 (16 nm), PRINTEX75 (17 nm) (manufactured by Degussa Co.), and #3950 (16 nm) (manufactured by Mitsubishi Chemical Corp.).

The specific examples of commercially available coarse particle carbon blacks include THERMAL BLACK (270 nm) (manufactured by Cancarb Co., Ltd.) and RAVEN MTP (275 nm) (manufactured by Columbia Carbon Co., Ltd.).

When two kinds of carbon blacks each having different average particle size are used in combination in a back coating layer, the proportion of the contents (by mass) of a fine carbon black having a particle size of from 10 to 20 nm and a coarse carbon black having a particle size of from 230 to 300 nm is preferably in the proportion of the former/the latter of from 98/2 to 75/25, and more preferably from 95/5 to 85/15.

The content of a carbon black in a back coating layer (the total amount when two kinds are used) is generally from 30 to 80 mass parts (i.e., weight parts), preferably from 45 to 65 mass parts, based on 100 mass parts of the binder.

It is preferred to use two kinds of inorganic powders each having different hardness. Specifically, a soft inorganic powder having a Mohs' hardness of from 3 to 4.5 and a hard inorganic powder having a Mohs' hardness of from 5 to 9 are preferably used in combination. By the addition of a soft inorganic powder having a Mohs' hardness of from 3 to 4.5, a friction coefficient can be stabilized against repeating-running. Moreover, a sliding guide pole is not scraped off with the hardness within this range. The average particle size of such a soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. These soft inorganic powders can be used alone or in combination of two or more.

The content of soft inorganic powders in a back coating layer is preferably from 10 to 140 mass parts (i.e., weight parts), and more preferably from 35 to 100 mass parts, based on 100 mass parts of the carbon black.

By the addition of a hard inorganic powder having a Mohs' hardness of from 5 to 9, the strength of a back coating layer is increased and running durability is improved. When such hard inorganic powders are used together with carbon blacks and the above-described soft inorganic powders, the deterioration due to repeating sliding is reduced and a strong back coating layer can be obtained. Appropriate abrasive capability is imparted to a back coating layer by the addition of hard inorganic powders and the adhesion of scratched powders to a tape guide pole is reduced. In particular, when a hard inorganic powder is used in combination with a soft inorganic powder, sliding characteristics against a guide pole having a rough surface are improved and the stabilization of a friction coefficient of a back coating layer can also be brought about.

The average particle size of hard inorganic powders is preferably from 80 to 250 nm, and more preferably from 100 to 210 nm.

The examples of hard inorganic powders having a Mohs' hardness of from 5 to 9 include, e.g., alpha-iron oxide, alpha-alumina, and chromium oxide ($Cr_2O_3$). These powders may be used alone or in combination. Of the above hard inorganic powders, alpha-iron oxide and alpha-alumina are preferred. The content of hard inorganic powders in a back coating layer is generally from 3 to 30 mass parts, and preferably from 3 to 20 mass parts, based on 100 mass parts of the carbon black.

When a soft inorganic powder and a hard inorganic powder are used in combination in a back coating layer, it is preferred to use them selectively such that the difference of hardness between the soft and hard inorganic powders is 2 or more, more preferably 2.5 or more, and particularly preferably 3 or more.

It is preferred that the above-described two kinds of inorganic powders each having specific average particle size and different Mohs' hardness and the above-described two kinds of carbon blacks each having different specific average particle size are contained in a back coating layer.

Lubricants may be contained in a back coating layer. The lubricants contained in a back coating layer can be arbitrarily selected from among those which can be used in a nonmagnetic layer or a magnetic layer as described above. The content of lubricants added to a back coating layer is generally from 1 to 5 mass parts based on 100 mass parts of the binder.

Support

Supports for use in the present invention are preferably nonmagnetic supports. The examples of nonmagnetic supports which can be used in the present invention include well-known films such as polyesters (e.g., polyethylene terephthalate and polyethylene naphthalate), polyolefins, cellulose triacetate, polycarbonate, polyamide (including aliphatic polyamide and aromatic polyamide such as aramid), polyimide, polyamideimide, polysulfone, and polybenzoxazole. Highly strong supports such as polyethylene naphthalate and polyamide are preferably used. If necessary, a lamination type support as disclosed in JP-A-3-224127 can be used to vary the surface roughnesses of a magnetic layer surface and a base surface. These supports may be subjected to surface treatments, such as corona discharge treatment, plasma treatment, easy adhesion treatment, heat treatment, and dust removing treatment in advance. It is also possible to use an aluminum or glass substrate as a support in the present invention.

For attaining the object of the present invention, it is preferred to use a support having a central plane average surface roughness (Ra) of 8.0 nm or less, preferably 4.0 nm or less, and more preferably 2.0 nm or less, measured by "TOPO-3D" (a product of WYKO Co., Ltd., U.S.A.). It is preferred that a support not only has a small central plane average surface roughness but also is free from coarse protrusions having a height of 0.5 µm or more. Surface roughness configuration is freely controlled by the size and the amount of fillers added to a support. The examples of such fillers include acryl-based organic fine powders, as well as oxides or carbonates of Ca, Si and Ti. A support for use in the present invention preferably has a maximum height (Rmax) of 1 µm or less, a ten point average roughness (Rz) of 0.5 µm or less, a central plane peak height (Rp) of 0.5 µm or less, a central plane valley depth (Rv) of 0.5 µm or less, a central plane area factor (Sr) of from 10 to 90%, and an average wavelength (λa) of from 5 to 300 µm. For obtaining desired electromagnetic characteristics and durability, surface protrusion distribution of a support can be controlled arbitrarily by fillers, e.g., the number of protrusions having sizes of from 0.01 to 1 µm can be controlled each within the range of from 0 to 2,000 per 0.1 mm². A support for use in the present invention has an F-5 value of preferably from 5 to 50 kg/mm² (49 to 490 MPa), a thermal shrinkage factor of a support at 100° C. for 30 minutes of preferably 3% or less, and more preferably 1.5% or less, and a thermal shrinkage factor at 80° C. for 30 minutes of preferably 1% or less, and more preferably 0.5% or less. A support has a breaking strength of from 5 to 100 kg/mm² (=about 49 to 980 MPa), an elastic modulus of from 100 to 2,000 kg/mm² (=about 0.98 to 19.6 GPa), a temperature expansion coefficient of from $10^{-4}$ to $10^{-8}/°$ C., and preferably from $10^{-5}$ to $10^{-6}/°$ C., and a humidity expansion coefficient of $10^{-4}$/RH % or less, and preferably $10^{-5}$/RH % or less. These thermal characteristics, dimensional characteristics and mechanical strength characteristics are preferably almost equal in every direction of in-plane of a support with difference of 10% or less.

Producing Method

Processes of preparing magnetic and nonmagnetic layer coating solutions for use in the magnetic recording medium in the present invention comprise at least a kneading step, a dispersing step and, optionally, blending steps to be carried out before and/or after the kneading and dispersing steps. Each of these steps may be composed of two or more separate stages. Materials such as a ferromagnetic powder, a non magnetic powder, a binder, a carbon black, an abrasive, an antistatic agent, a lubricant and a solvent for use in the present invention may be added in any step at any time. Each material may be added in two or more separate steps. For example, polyurethane can be added separately in a kneading step, a dispersing step, or a blending step for adjusting viscosity after dispersion. For achieving the object of the present invention, the above steps can be performed partly with conventional techniques. Powerful kneading machines such as an open kneader, a continuous kneader, a pressure kneader or an extruder is preferably used in a kneading step. When a kneader is used, a magnetic powder or a nonmagnetic powder and all or a part of a binder (preferably 30 mass % or more of the total binders) in the range of from 15 parts to 500 mass parts per 100 mass parts of the magnetic powder are kneading-treated. Details of kneading are disclosed in JP-A-1-106338 and JP-A-1-79274. When a magnetic layer solution and a lower layer solution are dispersed, glass beads can be used but dispersing media having a high specific gravity are preferably used, e.g., zirconia beads, titania beads and steel beads are suitable for this purpose. Optimal particle size and packing density of these dispersing media should be selected. Well-known dispersing apparatuses can be used in the present invention.

The following methods are preferably used for coating the magnetic recording medium having a multilayer constitution of the present invention. As the first method, a lower layer is coated by any of gravure coating, roll coating, blade coating, and extrusion coating apparatuses, which are ordinarily used in the coating of a magnetic coating solution, and then an upper layer is coated while the lower layer is still wet by means of a support pressing type extrusion coating apparatus as disclosed in JP-B-1-46186 (the term "JP-B" as used herein means an "examined Japanese patent publication"), JP-A-60-238179 and JP-A-2-265672. As the second method, an upper layer and a lower layer are coated almost simultaneously using a coating head equipped with two slits for feeding coating solution as disclosed in JP-A-63-88080, JP-A-2-17971 and JP-A-2-265672. As the third method, an upper layer and a lower layer are coated almost simultaneously using an extrusion coating apparatus equipped with a backup roll as disclosed in JP-A-2-174965. For preventing the electromagnetic characteristics of the magnetic recording medium from deteriorating due to agglomeration of magnetic powders, it is preferred to give shear to the coating solution in a coating head by the methods as disclosed in JP-A-62-95174 and JP-A-1-236968. With respect to the viscosity of a coating solution, the range of the numeric values disclosed in JP-A-3-8471 is necessary to be satisfied. For realizing the constitution of the present invention, a successive multilayer coating method of coating a lower layer, drying the lower layer and successively coating a magnetic layer on the lower layer can of course be used without impairing the effect of the present invention. However, for reducing coating defects and improving quality, e.g., dropout, it is preferred to use the above simultaneous multilayer coating method.

In the case of a magnetic disc, isotropic orienting property can be sufficiently obtained in some cases without performing orientation using orientating apparatus, but it is preferred to use well-known random orientation apparatuses, such as disposing cobalt magnets diagonally and alternately or applying an alternating current magnetic field using a solenoid. Isotropic orientation in ferromagnetic metal powders is in general preferably in-plane two dimensional random orientation, but it may be three dimensional random orientation having perpendicular factors. Hexagonal ferrites in general have an inclination for three dimensional random orientation of in-plane and in the perpendicular direction but it can be made in-plane two dimensional random orientation. It is also possible to impart to hexagonal ferrites isotropic magnetic characteristics in the circumferential direction by perpendicular orientation using well-known methods, e.g., using heteropolar-facing magnets. Perpendicular orientation is preferred particularly when a disc is used for high density recording. Circumferential orientation can be performed using spin coating.

In the case of a magnetic tape, orientation is performed in the machine direction using a cobalt magnet and a solenoid. In orientation, it is preferred that the drying position of the coated film can be controlled by controlling the temperature and the amount of drying air and coating velocity. Coating velocity is preferably from 20 to 1,000 m/min. and the temperature of drying air is preferably 60° C. or more. Preliminary drying can also be performed appropriately before entering a magnet zone.

The magnetic recording medium is generally subjected to calendering treatment after coating and drying. Use of heat resisting plastic rollers such as epoxy, polyimide, polyamide and polyimideamide, or metal rollers is effective for calendering treatment. Metal rollers are preferably used for the treatment particularly when magnetic layers are coated on both surface sides of a support. Temperature for treatment is preferably 50° C. or more, and more preferably 100° C. or more. Linear pressure is preferably 200 kg/cm (196 kN/m) or more, and more preferably 300 kg/cm (294 kN/m) or more.

Physical Properties

Saturation magnetic flux density of the magnetic layer of the magnetic recording medium according to the present invention is preferably from 0.1 to 0.3 T. Coercive force distribution is preferably narrow, and SFD is preferably 0.6 or less. A squareness ratio is from 0.55 to 0.67, preferably from 0.58 to 0.64, in the case of two dimensional random orientation, from 0.45 to 0.55 in the case of three dimensional random orientation, generally 0.6 or more in the vertical direction, preferably 0.7 or more, in the case of perpendicular orientation, and when demagnetization field correction is performed, 0.7 or more, and preferably 0.8 or more. Orientation ratio of two-dimensional random orientation and three-dimensional random orientation is preferably 0.8 or more. In the case of two dimensional random orientation, a squareness ratio, Br and Hc in the perpendicular direction are preferably from 0.1 to 0.5 times of those in the in-plane direction.

In the case of a magnetic tape, a squareness ratio is 0.6 or more, preferably 0.7 or more, and more preferably 0.8 or more.

The magnetic recording medium in the present invention has a friction coefficient against a head at temperature of from −10° C. to 40° C. and humidity of from 0% to 95% of 0.5 or less, preferably 0.3 or less, a surface intrinsic resistivity of the magnetic surface of preferably from $10^4$ to $10^{12}$ ohm/sq, a charge potential of preferably from −500 V to +500 V, an elastic modulus at 0.5% elongation of the magnetic layer of preferably from 100 to 2,000 kg/mm² (0.98 to 19.6 GPa) in every direction of in-plane, a breaking strength of preferably from 10 to 70 kg/mm² (98 to 686 MPa), an elastic modulus of preferably from 100 to 1,500 kg/mm² (0.98 to 14.7 GPa) in every direction of in-plane, a residual elongation of preferably 0.5% or less, and a thermal shrinkage factor at every temperature of 100° C. or less of preferably 1% or less, more preferably 0.5% or less, and most preferably 0.1% or less. The glass transition temperature of the magnetic layer (the maximum of loss elastic modulus by dynamic visco-elasticity measurement at 110 Hz) is preferably from 50° C. to 120° C., and that of the lower nonmagnetic layer is preferably from 0° C. to 100° C. The loss elastic modulus is preferably within the range of from $1 \times 10^9$ to $8 \times 10^{10}$ μN/cm², and loss tangent is preferably 0.2 or less. If loss tangent is too great, adhesion failure is liable to occur. These thermal and mechanical characteristics are preferably almost equal in every direction of in-plane of the medium within difference of 10% or less. The residual amount of the solvent contained in the magnetic layer is preferably 100 mg/m² or less, more preferably 10 mg/m² or less. The void ratio is preferably 30% by volume or less, more preferably 20% by volume or less, with both of the nonmagnetic layer and the magnetic layer. The void ratio is preferably smaller for obtaining high output but in some cases a specific value should be preferably secured depending upon purposes. For example, in a disc-like medium which is repeatedly used, large void ratio contributes to good running durability in many cases.

The magnetic layer preferably has a central plane average surface roughness (Ra) of 4.0 nm or less, preferably 3.8 nm or less, more preferably 3.5 nm or less, on measuring an area of about 250 μm×250 μm using "TOPO-3D" (a product of WYKO Co., Ltd., U.S.A.). The magnetic layer for use in the present invention preferably has a maximum height (Rmax) of 0.5 μm or less, a ten point average roughness (Rz) of 0.3 μm or less, a central plane peak height (Rp) of 0.3 μm or less, a central plane valley depth (Rv) of 0.3 μm or less, a central plane area factor (Sr) of from 20% to 80%, and an average wavelength ($\lambda$a) of from 5 to 300 µm. It is preferred to optimize electromagnetic characteristics and friction coefficient by setting surface protrusions of the magnetic layer within the above described range. They can be easily controlled by controlling the surface property by fillers in the support, controlling the particle size and the amount of the magnetic powders added to the magnetic layer, or varying the surface figure of the rollers used in the calendaring treatment. Curling is preferably within the range of ±3 mm.

When the magnetic recording medium according to the present invention comprises a nonmagnetic layer and a magnetic layer, these physical properties in the nonmagnetic layer and the magnetic layer can be varied according to purposes. For example, the elastic modulus of the magnetic layer is made higher to improve running durability and at the same time the elastic modulus of the nonmagnetic layer is made lower than that of the magnetic layer to improve the head touching of the magnetic recording medium.

EXAMPLE

The present invention will be described in detail below with reference to specific examples, but the present invention should not be construed as being limited thereto. In the examples, "part" means "mass part" unless otherwise indicated.

<Ferromagnetic Powder>

The hexagonal ferrite magnetic powders used in Examples are shown in Table 1 below.

TABLE 1

Barium Ferrite Magnetic Powder

| Kind | BaFe 1 | BaFe 2 | BaFe 3 | BaFe 4 | BaFe 5 | BaFe 6 | BaFe 7 |
|---|---|---|---|---|---|---|---|
| Selection by centrifugal separation | yes | yes | yes | yes | yes | yes | yes |
| Average tabular diameter (nm) | 30 | 20 | 38 | 30 | 20 | 45 | 30 |
| Average tabular thickness (nm) | 10 | 7 | 13 | 10 | 7 | 15 | 10 |
| Average particle volume (nm$^3$) | 5,800 | 1,700 | 12,000 | 5,800 | 1,700 | 20,000 | 5,800 |
| Percentage of particles having a particle size of 10 nm or less (%) | 5 | 7 | 0 | 5 | 3 | 20 | 15 |
| Hc (kA/m) | 183 | 178 | 180 | 183 | 265 | 360 | 320 |
| σs (A · m$^2$/kg) | 50 | 47 | 60 | 50 | 47 | 60 | 50 |
| S$_{BET}$ (m$^2$/g) | 65 | 70 | 48 | 65 | 70 | 45 | 65 |

In Table 1, "yes" in the row of "Selection by Centrifugal Separation" means that each magnetic powder was subjected to the treatment of 100,000 rpm for 10 minutes.

About 500 particles were photographed with a transmission electron microscope (TEM) of 500,000 magnifications and particle size distribution was measured by an image analyzer.

Example 1

<Preparation of Coating Solution>

Magnetic coating solution

| | |
|---|---|
| Barium ferrite magnetic powder (BaFe1) | 100 parts |
| Vinyl chloride copolymer MR110 | 10 parts |

-continued

<Preparation of Coating Solution>

| | |
|---|---|
| (manufactured by Nippon Zeon Co., Ltd.) | |
| Polyurethane resin UR 8200 | 5 parts |
| (manufactured by Toyobo Co., Ltd.) | |
| alpha-Alumina HIT55 | 5 parts |
| (manufactured by Sumitomo Chemical Co., Ltd.) | |
| Average particle size: 0.2 µm | |
| Carbon black #55 | 1 part |
| (manufactured by Asahi Carbon Co., Ltd.) | |
| Average particle size: 0.075 µm | |
| Specific surface area (S$_{BET}$): 35 m$^2$/g | |
| DBP oil absorption: 81 ml/100 g | |
| pH: 7.7 | |
| Volatile content: 1.0% | |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Nonmagnetic coating solution | |
| | |
| Nonmagnetic powder (acicular hematite) | 80 parts |
| Average long axis length: 0.15 µm | |
| Specific surface area (S$_{BET}$): 50 m$^2$/g | |
| pH: 8.5 | |
| Surface-covering compound: Al$_2$O$_3$, | |
| Carbon black | 20 parts |
| Average particle size: 20 nm | |
| Vinyl chloride copolymer MR110 | 12 parts |
| (manufactured by Nippon Zeon Co., Ltd.) | |
| Polyurethane resin UR 8200 | 5 parts |
| (manufactured by Toyobo Co., Ltd.) | |
| Butyl stearate | 1 part |
| Stearic acid | 3 parts |
| Methyl ethyl ketone/cyclohexanone (8/2 mixed solvent) | 250 parts |

Preparation of Computer Tape

With each of the above compositions of the coating solutions for forming a magnetic layer and a nonmagnetic layer, components were blended in a kneader, and then dispersed in a sand mill for 4 hours. Polyisocyanate was added to each resulting dispersion solution, 2.5 parts to the nonmagnetic layer coating solution, and 3 parts to the magnetic layer coating solution. Further, 40 parts of cyclohexanone was added to each solution, and each solution was filtered through a filter having an average pore diameter of 1 µm to obtain coating solutions for forming a nonmagnetic layer and a magnetic layer. The obtained nonmagnetic layer-forming coating solution and magnetic layer-forming coating solution were simultaneously multilayer-coated on an aramid support having a thickness of 4.4 µm, a central plane average surface roughness of 2 nm. The nonmagnetic layer-forming coating solution was coated in a dry thickness of 1.7 µm, immediately thereafter the magnetic layer-forming coating solution was coated on the lower layer in a dry thickness of 0.1 µm. Both layers were subjected to orientation with a cobalt magnet having a magnetic force of 0.6 T and a solenoid having a magnetic force of 0.6 T while both layers were still wet. After drying, the coated layers were subjected to calendering treatment by a calender of 7 stages comprising metal rolls alone at 85° C. and a velocity of 200 m/min. Subsequently, a back coating layer (100 parts of a carbon black having an average particle size of 17 nm, 80 parts of calcium carbonate having an average particle size of 40 nm, and 5 parts of alpha-alumina having an average particle size of 200 nm were dispersed in a nitrocellulose resin, a polyurethane resin, and a polyisocyanate) having a thickness of 0.5 µm was coated. The obtained web was slit to a width of 3.8 mm. The magnetic layer surface of the thus-obtained strip was cleaned with a tape cleaning apparatus having delivery and winding-up movement of a slit product to which a nonwoven fabric and a razor blade are attached so as to be pressed against the surface of the tape. Thus, a tape sample was obtained.

Examples 2 to 5 and Comparative Examples 1 and 2

Tape samples were prepared in the same manner as in Example 1 except that barium ferrite magnetic powder and a magnetic layer were changed as shown in Table 2 below.

Example 2 was the case where the magnetic powder had a small tabular diameter, Example 3 was the case where the magnetic powder had a large tabular diameter, Example 4 was the case where the magnetic layer had a thick layer thickness, and Example 5 was the case where the magnetic powder had a small tabular diameter and a high Hc, and the magnetic layer had a thin layer thickness.

Performances of each of the above-prepared computer tapes were evaluated as follows, and the results obtained are shown in Table 2.

(1) Magnetic characteristics

Hc: Hc was measured by a vibrating sample magnetometer (a product of Toei Kogyo Co., Ltd.) by Hm 10 kOe (800 kA/m).

High Hc part (%): Parts subjected to magnetic flux revolution by the applied magnetic field of 400 kA/m (5,000 Oe) or higher in the distribution of magnetization of the magnetic layer were measured by the method as described above.

(2) C/N ratio: Measurement was performed with a recording head (MIG, gap length: 0.15 μm, a track width: 18 μm, 1.8 T) and an MR head for reproduction (a shield type head, gap length between shields: 0.2 μm, a track width: 4 μm) being attached to a drum tester. Single frequency signals of recording wavelength of 0.2 μm (50 MHz) were recorded by relative speed of head-medium of 10 m/min, and the reproduced signals were subjected to frequency analysis with a spectrum analyzer (a product manufactured by Shibasoku K. K.), and the ratio of the output voltage of the above single frequency signals to the voltage of noise 1 MHz apart was taken as a C/N ratio. Bias current was applied to the MR head at reproduction so that the reproduction output became maximum.

(3) Overwriting erasure rate: The same measuring instrument as used in the above C/N ratio was used. In the first place, a signal of recording wavelength of 0.8 μm (12.5 MHz) was recorded, and the residual rate of the signal of recording wavelength of 0.8 μm of the time when a signal of recording wavelength of 0.2 μm (50 MHz) was overwritten was taken as overwriting erasure rate. In general, −20 dB or less is necessary.

TABLE 2

|  | Ex. 1 | Ex. 2 | Ex. 3 | Ex. 4 | Ex. 5 | Comp. Ex. 1 | Comp. Ex. 2 |
|---|---|---|---|---|---|---|---|
| Kind of hexagonal ferrite magnetic powder | BaFe 1 | BaFe 2 | BaFe 3 | BaFe 4 | BaFe 5 | BaFe 6 | BaFe 7 |
| Magnetic layer |  |  |  |  |  |  |  |
| Hc (kA/m) | 191 | 186 | 188 | 191 | 280 | 370 | 340 |

TABLE 2-continued

|  | Ex. 1 | Ex. 2 | Ex. 3 | Ex. 4 | Ex. 5 | Comp. Ex. 1 | Comp. Ex. 2 |
|---|---|---|---|---|---|---|---|
| High Hc part (%) | 0.5 | 0.8 | 0.1 | 0.5 | 0.2 | 1.8 | 1.3 |
| Thickness (μm) | 0.1 | 0.1 | 0.1 | 0.18 | 0.05 | 0.1 | 0.25 |
| C/N ratio | 3.9 | 4.4 | 3.2 | 4.0 | 4.7 | 0.5 | 0.8 |
| Overwriting erasure rate | −28 | −23 | −29 | −22 | −27 | −22 | −16 |

In Comparative Example 1, wherein the average tabular diameter was as large as 45 nm, Hc was high, and the high Hc part was 1.8% which was higher by 1% or more, accordingly, sufficient C/N ratio could not be obtained due to high noise.

In Comparative Example 2, wherein the high Hc part was 1.3%, which was high as compared with that in Example 1, and the magnetic layer thickness was also as high as 0.25 μm, accordingly, sufficient C/N ratio could not be obtained due to high noise and overwriting erasure rate was also insufficient.

Every sample tape in Examples according to the present invention showed higher C/N ratio and sufficient overwriting erasure rate as compared with the samples in Comparative Examples.

Effect of the Invention

The present invention can provide a coating type magnetic recording medium which is excellent in productivity and conspicuously improved in C/N ratio in high density recording region in a recording and reproducing system integrated with an MR head.

The entitle disclosure of each and every foreign patent application from which the benefit of foreign priority has been claimed in the present application is incorporated herein by reference, as if fully set forth herein.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a support having thereon a magnetic layer containing a ferromagnetic powder and a binder as main components, wherein the ferromagnetic powder is a hexagonal ferrite powder having an average tabular diameter of from 10 to 40 nm, and a part which is subjected to magnetic flux revolution by the application of a magnetic field of 400 kA/m (5,000 Oe) or higher in the distribution of magnetization of the magnetic layer is less than 1%.

2. The magnetic recording medium as in claim 1, wherein the magnetic recording medium is a magnetic recording medium for reproduction with a magneto-resistance type magnetic head.

3. The magnetic recording medium as in claim 1, wherein the magnetic layer has a coercive force of 159 kA/m (2000 Oe) or more.

* * * * *